(12) United States Patent
Ruegsegger et al.

(10) Patent No.: US 10,619,651 B2
(45) Date of Patent: Apr. 14, 2020

(54) COLLAPSIBLE/ EXTENDABLE ASPIRATOR SYSTEM

(71) Applicant: GOODRICH CORPORATION, Charlotte, NC (US)

(72) Inventors: Nick Ruegsegger, Peoria, AZ (US); Helperus Ritzema Rautenbach, Tempe, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 73 days.

(21) Appl. No.: 15/828,764

(22) Filed: Dec. 1, 2017

(65) Prior Publication Data

US 2018/0087537 A1 Mar. 29, 2018

Related U.S. Application Data

(62) Division of application No. 14/802,055, filed on Jul. 17, 2015, now Pat. No. 9,863,442.

(51) Int. Cl.
| | |
|---|---|
| *F04F 5/46* | (2006.01) |
| *B64D 25/14* | (2006.01) |
| *F04F 5/20* | (2006.01) |
| *F04F 5/48* | (2006.01) |
| *B63C 9/00* | (2006.01) |

(52) U.S. Cl.
CPC .............. *F04F 5/463* (2013.01); *B64D 25/14* (2013.01); *F04F 5/20* (2013.01); *F04F 5/46* (2013.01); *F04F 5/48* (2013.01); *B63C 2009/0076* (2013.01)

(58) Field of Classification Search
CPC .... F04F 5/463; F04F 5/466; F04F 5/16; F04F 5/48; F04F 5/20; B64D 25/14; B63C 9/24; B63C 2009/0076; B60R 21/272
See application file for complete search history.

(56) References Cited

U.S. PATENT DOCUMENTS

| | | |
|---|---|---|
| 3,370,784 A | 2/1968 | Day |
| 3,598,504 A | 8/1971 | Siravo |
| 3,640,645 A | 2/1972 | Forsythe |
| 4,566,862 A | 1/1986 | Halavais |
| 4,671,744 A | 6/1987 | Shaffer et al. |
| 6,004,176 A | 12/1999 | Moran |
| 6,071,084 A | 6/2000 | Wass et al. |

(Continued)

FOREIGN PATENT DOCUMENTS

| | | |
|---|---|---|
| CN | 101180216 | 5/2008 |
| EP | 2243963 | 10/2010 |

(Continued)

OTHER PUBLICATIONS

Extended European Search Report dated Dec. 6, 2016 in European Application No. 16179899.6.

(Continued)

*Primary Examiner* — Kenneth J Hansen
(74) *Attorney, Agent, or Firm* — Snell & Wilmer L.L.P.

(57) ABSTRACT

An aspirator system is disclosed comprising a collapsible/extendable aspirator air channel, wherein a burstable seal for entrapping air across the exit channel is provided, wherein said entrapped air creates a pressure causing the aspirator to extend to its extended state, whereupon the seal bursts and opens the air channel.

3 Claims, 8 Drawing Sheets

(56) References Cited

U.S. PATENT DOCUMENTS

| | | | |
|---|---|---|---|
| 8,066,493 B2 | 11/2011 | Renz et al. | |
| 2003/0151241 A1* | 8/2003 | Matsuda | B60R 21/261 280/736 |
| 2010/0266424 A1 | 10/2010 | Renz et al. | |
| 2014/0208975 A1* | 7/2014 | Kobayashi | B60R 21/272 102/530 |

FOREIGN PATENT DOCUMENTS

| | | |
|---|---|---|
| FR | 2140918 | 1/1973 |
| WO | 8302981 | 9/1983 |

OTHER PUBLICATIONS

Preinterview First Office Action dated Aug. 1, 2017 in U.S. Appl. No. 14/802,055.
Notice of Allowance dated Nov. 8, 2017 in U.S. Appl. No. 14/802,055.
European Patent Office, European Office Action dated May 7, 2019 in Application No. 16179899.6.
China Patent Agent, Chinese Search Report dated Sep. 12, 2019 in Application No. 201610557849.8.
China Patent Agent, First Chinese Office Action dated Sep. 23, 2019 in Application No. 201610557849.8.
Machine English Translation of CN101180216 from Espacenet on Nov. 21, 2019.

* cited by examiner

COLLAPSIBLE/ EXTENDABLE ASPIRATOR SYSTEM

CROSS-REFERENCE TO RELATED APPLICATIONS

This application is a divisional of, claims priority to and the benefit of, U.S. Ser. No. 14/802,055 filed Jul. 17, 2015 and entitled "COLLAPSIBLE/EXTENDABLE ASPIRATOR SYSTEM," which is incorporated herein in its entirety for all purposes.

BACKGROUND

Inflatable emergency evacuation devices such as aircraft evacuation slides, emergency life rafts and similar devices typically include a charged cylinder and an aspirator. Such equipment is typically stored in a limited packing space and thus is often densely packaged. The high package density may lead to various issues including cracked aspirators, which may be fragile. Therefore, it is desirable to minimize the volume of the inflatable emergency evacuation device in its packed condition.

SUMMARY

In accordance with various embodiments, disclosed is an aspirator system comprising, an air channel movable between a collapsed state and an extended state, said air channel comprising, an aspirator body having a longitudinal axis, an aspirator barrel in translating engagement with said aspirator body, and a nozzle assembly disposed within said aspirator body, and configured to direct gas through said air channel, and a pressure removable block, configured to seal said air channel in said collapsed state, wherein said aspirator barrel is configured to extend from said aspirator body in response to a first pressure, said first pressure created in response to gas directed through said air channel against said pressure removable block, and wherein said pressure removable block is configured to unseal said air channel in response to a second pressure, said second pressure created as gas is directed through said air channel against said pressure removable block.

In one aspect, said aspirator barrel is configured to extend from said aspirator body from a short axial length to an extended axial length along said longitudinal axis, wherein said second pressure is created upon extension of said aspirator barrel to said extended axial length.

In one aspect, said aspirator body further comprising a rim configured to prevent said aspirator barrel from further translation upon extension of said aspirator barrel to said extended axial length.

In one aspect, said second pressure is greater than said first pressure.

In one aspect, wherein said pressure removable block is a rupturable seal configured to tear upon application of said second pressure and bonded at an opening of said aspirator barrel.

In one aspect, wherein said rupturable seal is a fabric.

In one aspect, said rupturable seal comprising a weakened segment, wherein said rupturable seal is designed to tear at said weakened segment.

In one aspect, said aspirator barrel comprising an air channel exit through which said gas is directed, said pressure removable block configured to seal said air channel at said air channel exit.

In one aspect, said aspirator barrel being collapsible, and at least partially retainable within said aspirator body.

In one aspect, further comprising an inflatable device configured to receive gas from said air channel.

In one aspect, said aspirator barrel comprising a first telescoping segment and a second telescoping segment, said first telescoping segment configured to extend from and collapse into said aspirator body, and said second telescoping segment configured to extend from and collapse into said first telescoping segment.

In one aspect, said air channel further comprising an interior lining member configured to fold in the collapsed state, and extend to form a smooth interior of said air channel in the extended state.

In one aspect, said interior lining member comprising a fabric.

In one aspect, an extension holder is configured to apply a mechanical extension force on said air channel.

In one aspect, said extension holder comprising a spring.

In various embodiments, an aspirator method is provided comprising pressuring an air channel, said air channel being sealed with a seal, said air channel having extendable channel walls, and being in a collapsed state, extending an aspirator barrel in response to an extending pressure and bursting said seal in response to a burst pressure.

In one aspect, wherein the aspirator barrel comprises an extendable channel wall comprising a telescoping segment that is lockable upon extension of said extendable channel wall.

In one aspect, further comprises inflating an inflatable device using said aspirator channel.

An aspirator method is provided herein comprising sealing an air channel with a seal to create a pressurizable enclosure, said air channel forming an aspirator system, pressurizing the air channel to form an extending pressure against the seal.

In one aspect, further comprises extending an aspirator barrel from an aspirator body of said air channel, retaining said aspirator barrel against an inwardly flared rim of said aspirator body, and pressurizing the air channel to form a burst pressure against the seal.

DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In accordance with various embodiments, shown in the figures is an aspirator system 101 comprising an air channel 100 movable between a collapsed state and an extended state along a longitudinal axis 113, the air channel 100 including an aspirator body 102, an aspirator barrel 112, and a pressure removable block 111, preferably comprising a seal 108 which is rupturable. Air channel 100 further includes a portion 116 which is collapsible and extendable, and which is preferably at least a portion of the aspirator barrel 112. Portion 116 or aspirator barrel 112 is at least partially retainable in aspirator body 102, and is configured to extend from a short axial length to an extended axial length along longitudinal axis 113. Aspirator body 102 generally houses a nozzle assembly 103, which is coupled to an air-flow assembly 105 and configured to direct gas though air channel 100. According to various embodiments, aspirator system 101 further comprises an inflatable emergency evacuation device which may be coupled to air channel 100 at its air channel exit 110.

During typical use, the nozzle assembly 103 directs primary gas at high velocity from the air-flow assembly 105 (e.g. from a charged cylinder) into the air channel 100, further causing secondary gas from the outside air to get pulled into air channel 100 due to the Venturi effect. When air channel 100 is in its collapsed and sealed state, air pressure created in response to gas directed through the air channel 100 against the pressure removable block 111 or seal 108 causes the portion 116 and/or aspirator barrel 112 of the air channel 100 to extend along longitudinal axis 113. This is due to pressure build up as gas fills air channel 100. Once portion 116 is fully extended, further inflow of gas into the air channel 100 causes further pressure build up, causing seal 108 to break/burst. Once the air channel 100 is fully extended, and seal 108 is broken, gas may be communicated through the air channel 100.

As shown in the figures, air channel 100 includes an air channel exit 110 wherein rupturable seal ("burst seal" or "burstable seal") 108 is bonded or otherwise attached across air channel exit 110, in accordance with various embodiments. When air channel 100 is in its collapsed state (see FIG. 1), wherein the seal 108 is intact prior to bursting, a first air pressure (also referred to an extending pressure) created by the inflow of gas (depicted by arrow 114) through the channel interior 109, from air-flow assembly 105, against seal 108 translates portion 116 from a collapsed state to its operational, generally extended state (see FIG. 2A), whereupon a second pressure (also referred to as bursting pressure), which is pressure that builds once the volume of channel interior 109 is fixed, causes the seal 108 to burst (see FIG. 2B). Typically, aspirator system 101 is configured such that the second pressure is greater than the first pressure.

In accordance with various embodiments, air channel 100 is generally cylindrical. According to various embodiments, aspirator barrel 112 may be slightly outwardly flared, and/or narrowed with respect to the aspirator body 102. In accordance with various embodiments, aspirator barrel 112 forms portion 116, and houses, at least partially within aspirator body 102 in its collapsed state.

Various geometrical configurations and structural arrangements of the air channel are contemplated here, considering such issues as design preference, user preferences, applications, marketing preferences, cost, structural considerations, available materials, hereinafter developed components, etc., According to various embodiments, portion 116 comprises one or more collapsible segments. Increasing the number of segments may increase compactness of the air channel 100, though the levelness and/or evenness of the walls of channel interior 109 may be compromised due to segmentation of the air channel 100. Thus, in various embodiments, where it may be desirable to provide a leveled channel interior 109, there may be a tradeoff between functionality and compactness. However, in embodiments including an internal flexible liner (see below) this may be avoided.

According to various embodiments, portion 116 comprises segments which are self-interlocking upon extension. According to various embodiments, the self-interlocking segments are friction interlocking. According to various embodiments, an extension holder such as a spring may be provided to facilitate maintenance of the extended state.

Figure 1:
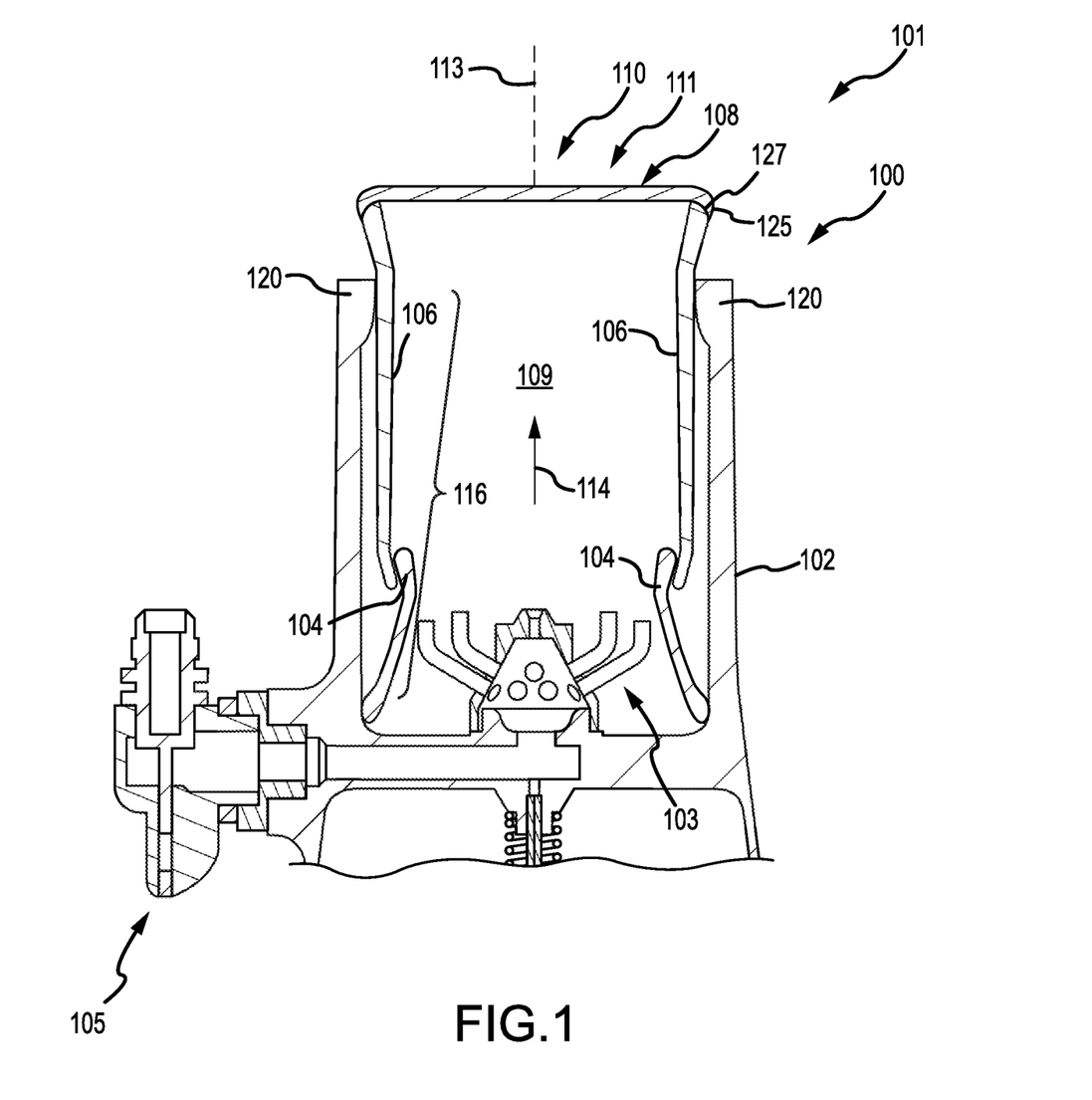
FIG. 1 is a cross-section view of an aspirator system comprising a collapsible/extendable aspirator air channel shown in a collapsed state, in accordance with various embodiments.
Figure 2A:
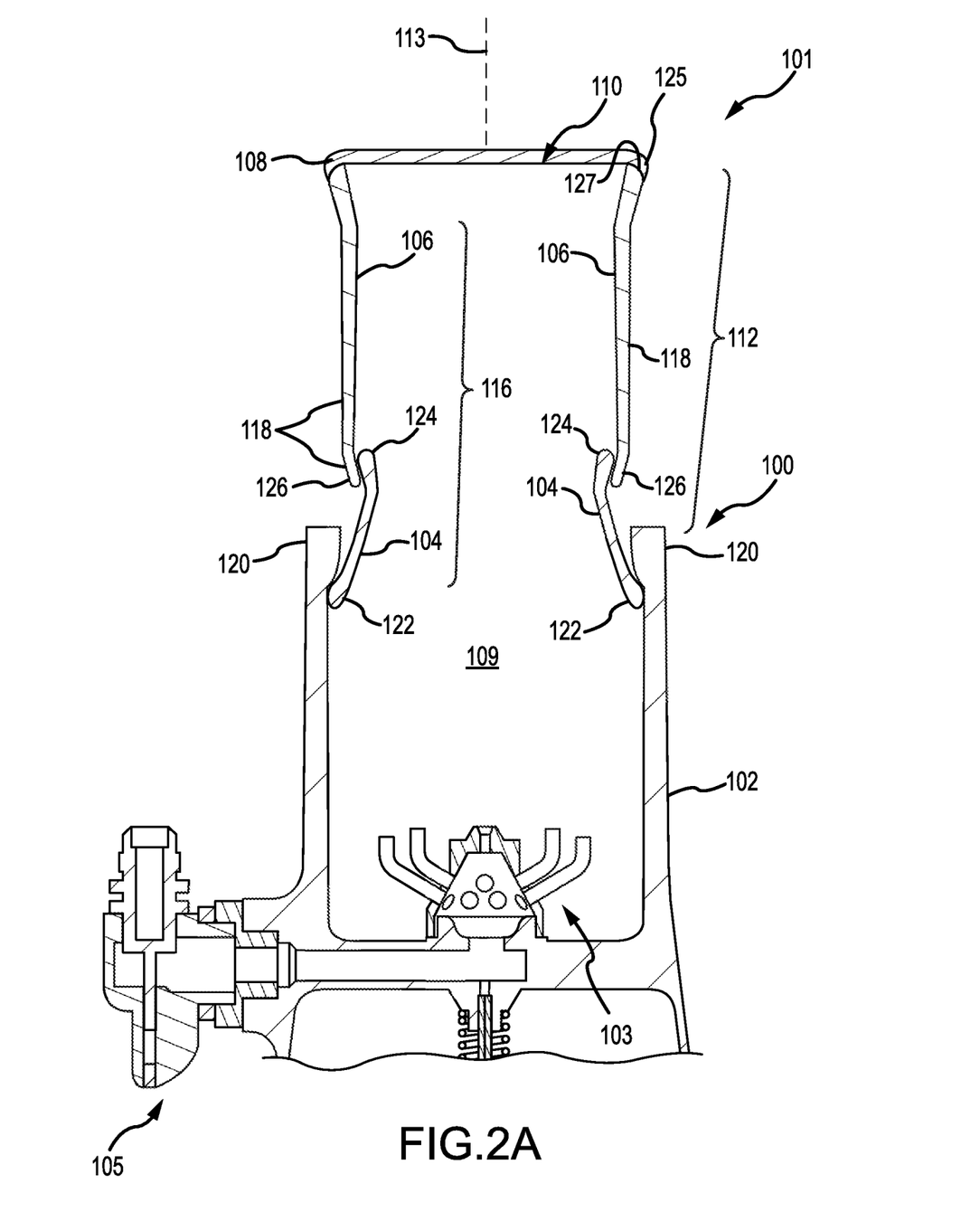
FIG. 2A shows the aspirator system of FIG. 1, with the aspirator air channel in an extended state and the seal is intact, in accordance with various embodiments.
Figure 2B:
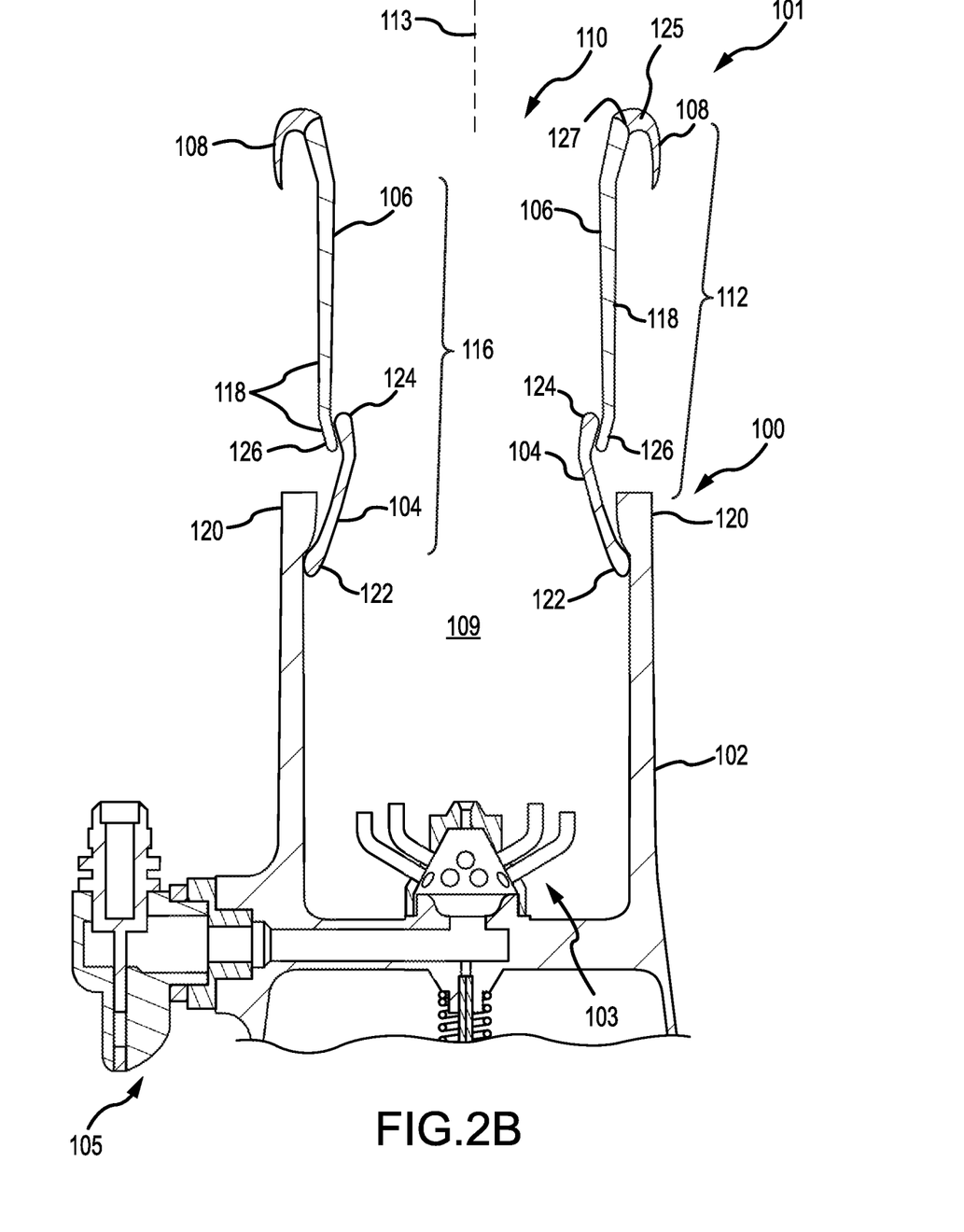
FIG. 2B shows the aspirator system of FIG. 1, with the aspirator air channel in an extended state and the seal is burst, in accordance with various embodiments.

FIG. 1 shows air channel 100 in its collapsed (packed) state, comprising aspirator body 102, and telescoping segments comprising a first telescoping segment 104, and a second telescoping segment 106, (telescoping segments 104, 106) which are in a collapsed state, with seal 108 bonded or otherwise attached across the air channel exit 110. Upon extension of air channel 100 (see FIGS. 2A and B), telescoping segments 104 and 106, extend to form aspirator barrel 112.

According to certain embodiments, telescoping segments 104, 106, and aspirator body 102 have flanged ends or rims that extend radially inward with respect to aspirator body 102, which form a friction lock upon full extension, and thus prevent aspirator barrel 112 from further extension. This is illustrated in FIGS. 2A and B, wherein the top rim 120 of aspirator body 102 is shown interlocked with the bottom rim 122 of telescoping segment 104, and the top rim 124 of telescoping segment 104 is shown interlocked with the bottom rim 126 of telescoping segment 106. In this regard, the top rim 124's flared configuration retains aspirator barrel 112 against aspirator body 102 and resists and/or prevents further axial extension from aspirator body 102. According to various embodiments, telescoping segments 104, 106 are made from a plastic or metal material.

A variety of geometric configurations, structural arrangements, and/or materials and/or methods of facilitating interlocking functionality are contemplated herein in consideration of issues such as design preference, user preferences, applications, marketing preferences, cost, structural requirements, available materials, hereinafter developed technology, etc. For example, the rims may be stepped, the walls may be conical, and/or include interlocking groves, etc.

According to various embodiments, seal 108 is bonded across air channel exit 110, around the outer lip 125 of air channel 100, to form an air-tight closure. According to various embodiments, seal 108 forms a cap bonded at the outer wall 127 of air channel 100, adjacent to outer lip 125. Various suitable techniques of adhesion will be apparent to one skilled in the art. For example, the fabric seal may be bonded with urethane based adhesive or may be mechanically fastened by bonding it to a rubber flange that may be attached with a band clamp. Additionally, a ruptured seal may be replaced for reuse.

According to various embodiments, seal 108 is a fabric having a strength suitable to sustain enough pressure for the channel 100 to expand before collapsing, but burst upon full extension. According to various embodiments, it is desirable for the seal 108 to be thin in order to reduce its interference with the channel 100 after bursting. According to various embodiments, a suitable material may include, for example, nylon, rayon, silk, polyester, cotton, ballistic nylon, and neoprene coated nylon. Other suitable materials are contemplated herein. Other geometries of aspirator barrel 112 are contemplated herein.

Figure 3A:
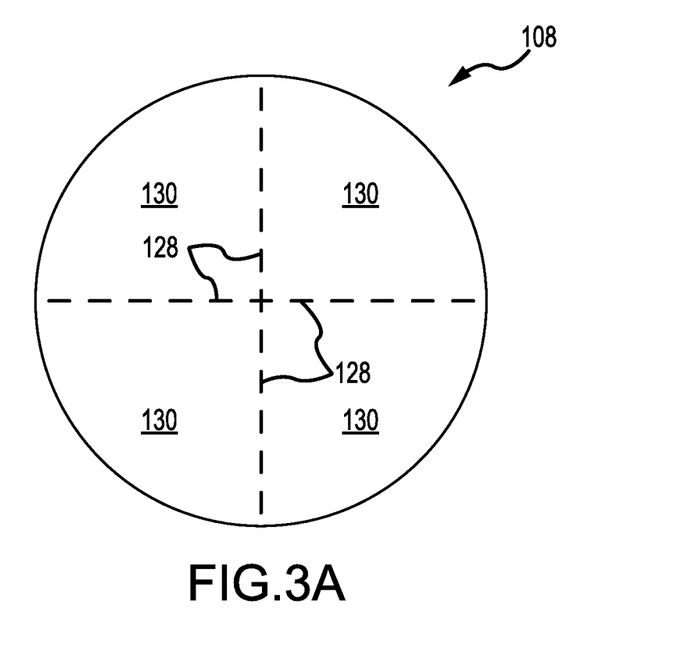
FIG. 3A is a view of a seal for the aspirator system of FIG. 1, in accordance with various embodiments.
Figure 3B:
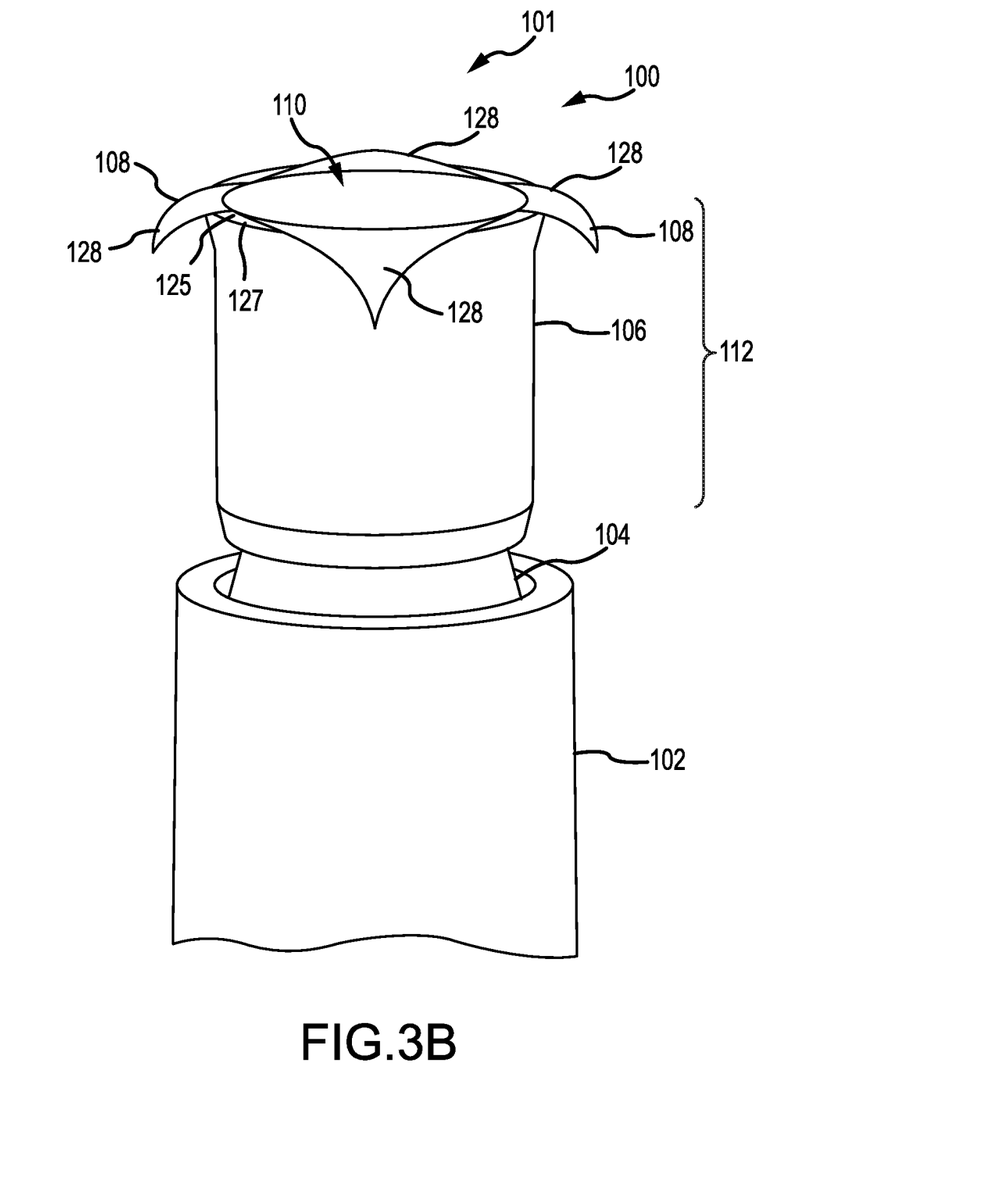
FIG. 3B is a perspective view of the aspirator system of FIG. 1, the aspirator air channel shown in its extended state, with a ruptured seal, in accordance with various embodiments.

According to various embodiments, seal 108 may include rupture control sections comprising weakened points, segments, and/or area(s), which may be created by scoring the seal 108, designed to control the pattern of tearing. For example, FIG. 3 shows seal 108 as a fabric disk including weakened segments 128 outlining triangular sections 130, wherein seal 108 is configured to tear at weakened segments 128 in accordance with various embodiments.

Figure 4A:
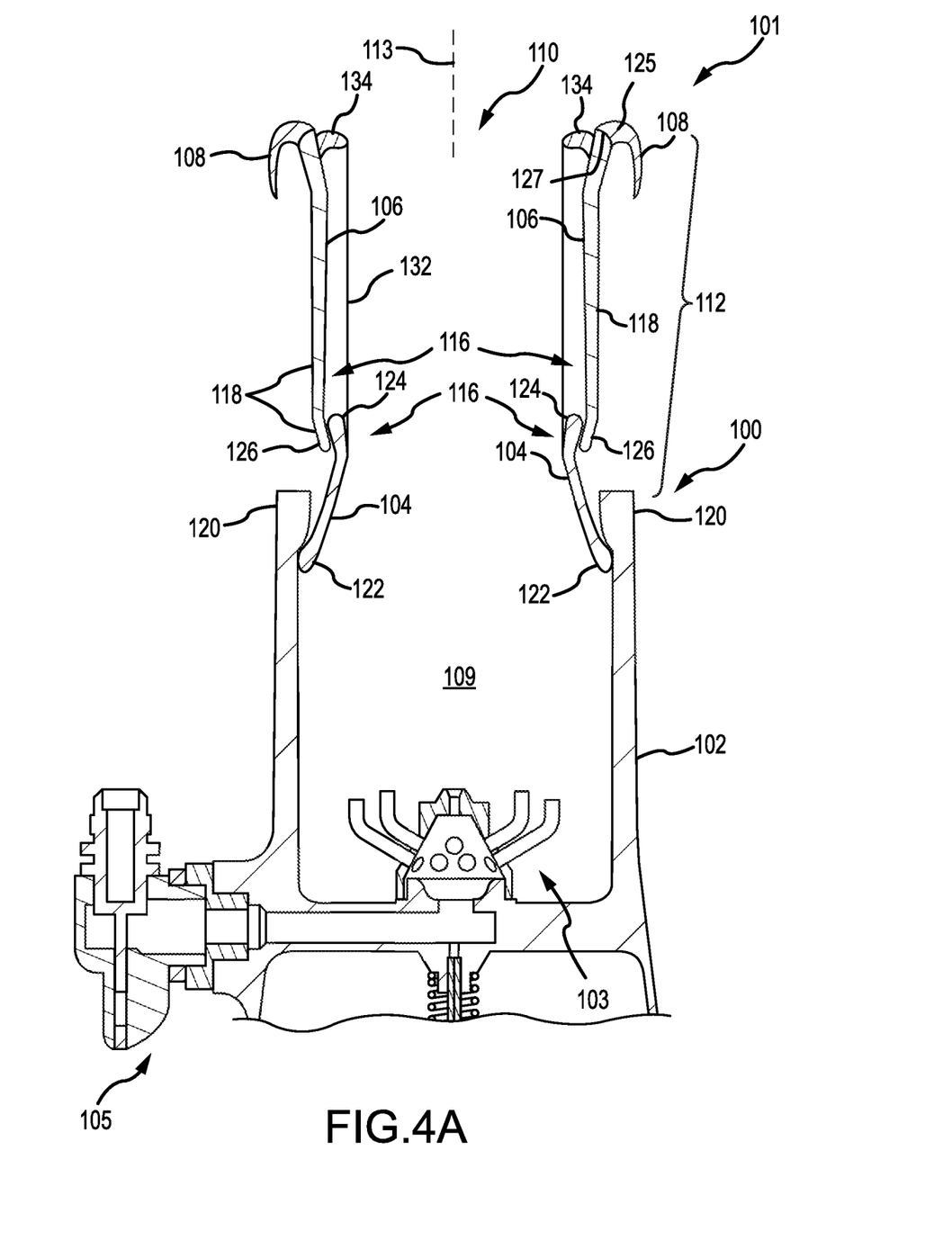
FIG. 4A illustrates the aspirator system of FIG. 1, the aspirator air channel in an extended state, comprising a compressible/extendible internal tube, in accordance with various embodiments.

According to various embodiments, aspirator system 101 may further comprise an interior lining member 132, which folds in the collapsed state, and extends to form a smooth interior of the channel in the extended state. According to various embodiments, interior lining member 132 extends at least partially through portion 116, and may extend further according to various embodiments. An example is shown in FIG. 4, where interior lining member 132 is attached to, and extends from telescoping segment 104 to telescoping segment 106. In various embodiments, additional rim 134 has been added to provide an attachment site at telescoping segment 106 level with the attachment site to create an attachment point which is leveled with the attachment site at telescoping segment 104. According to various embodiments, interior lining member 132 is made of a flexible material, such as fabric.

Figure 4B:
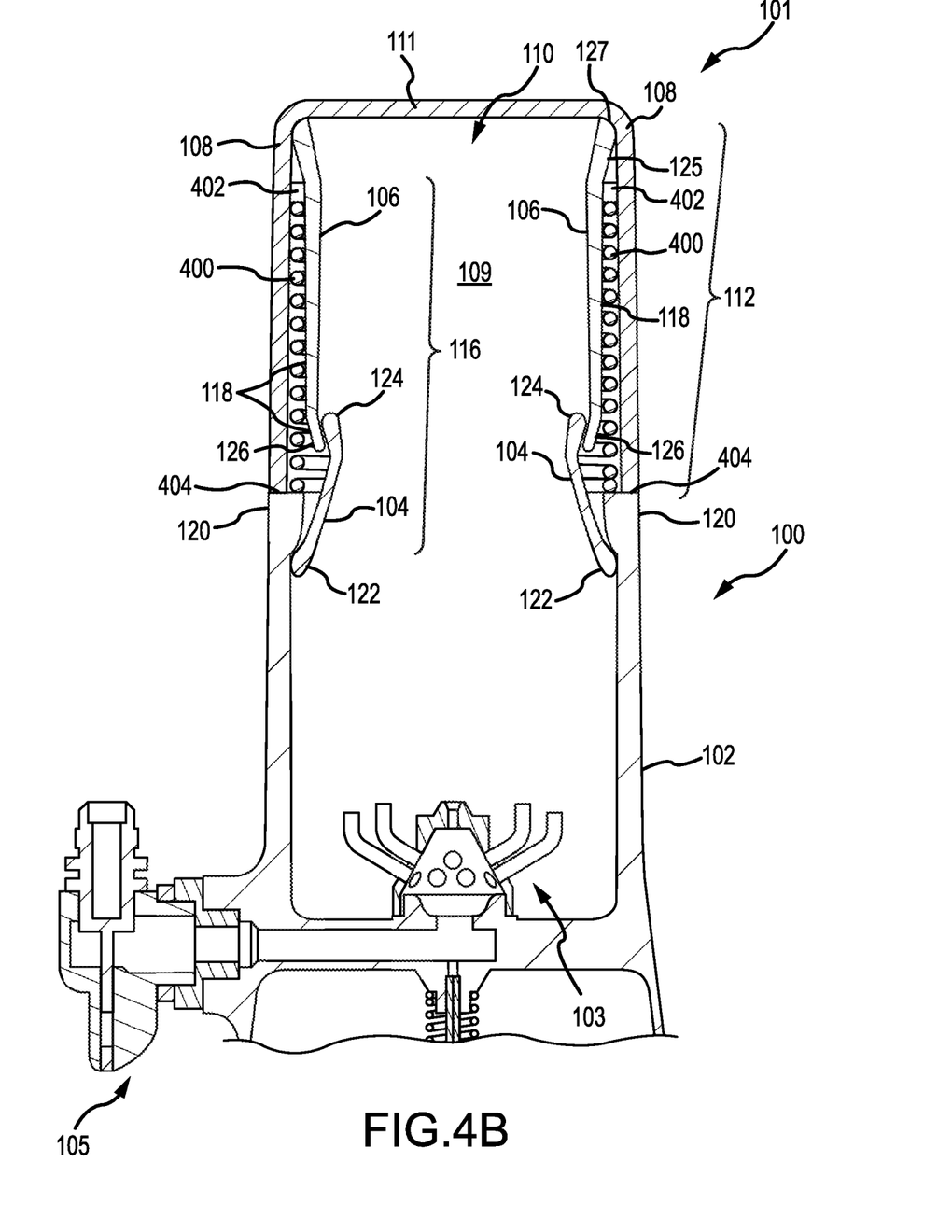
FIG. 4B illustrates the aspirator system of FIG. 1, the aspirator air channel in an extended state, comprising an extension holder and spring.

With reference to FIG. 4B, according to various embodiments, an extension holder such as a spring 400 may be provided to facilitate maintenance of the extended state. In various embodiments, spring 400 (e.g. which may be a small wire diameter coil spring) may be wrapped around the outside walls 118 of aspirator barrel 112, and captured between an additional rim 402 extending outwardly from outer lip 125 (e.g. opposite additional rim 134) and top rim 120 of aspirator body 102. In various embodiments, seal 108 (which may be a cap type seal) is bonded or otherwise attached at an attachment site 404 around top rim 120, and serves to retain the spring 400. In response to seal rupture, the spring 400 provides a mechanical extension force to bias portion 116 and aspirator barrel 112 to the extended state. According to various embodiments, spring 400 has a spring constant lower than what would be associated with shearing the fabric cap, and may serve to extend aspirator barrel 112 in the event that the seal bursts before full extension.

According to an exemplary embodiment, an about 4 inch (10.16 cm) diameter aspirator barrel comprises two telescoping segments, and is approximately 18 inches (45.72 cm) long in its fully extended position. In its packed condition, the aspirator is approximately 9 inches (22.86 cm).

Figure 5:
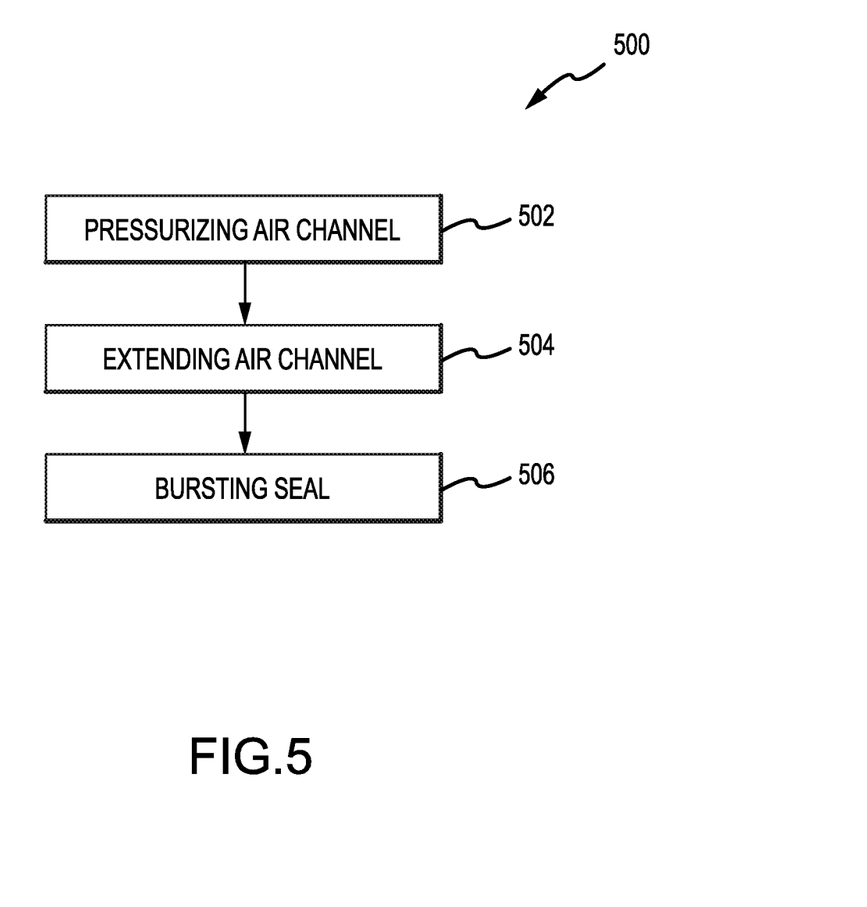
FIG. 5 illustrates an aspirator method, in accordance with various embodiments.

FIG. 5 illustrates an aspirator method 500, according to various embodiments, which comprises pressurizing air channel 502. In pressurizing air channel 502, an air channel is pressurized with a gas, for example gas from a charged cylinder. The air channel may comprise extendable channel walls and be in a non-extended state. The method further comprises extending the air channel 504 via the pressurizing. The method further comprises bursting the seal 506 via the pressurizing. The channel may undergo resealing after bursting.

Additionally, an aspirator method according to various embodiments, may comprise sealing the air channel of a collapsible/extendable aspirator with a seal to create a pressurizable enclosure, wherein pressure against the seal is capable of extending the air channel, and wherein pressure against the seal is further capable of causing the air channel to unseal.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An aspirator method comprising:

pressurizing an air channel, said air channel being at least partially defined by an aspirator barrel in translating engagement with an aspirator body, wherein the air channel is sealed with a seal coupled to an opening of the aspirator barrel, wherein in response to pressurizing the air channel, the aspirator barrel translates along the aspirator body to transition from a collapsed state to an extended state; and in response to the aspirator barrel being in the extended state, further pressurizing the air channel to burst the seal.

2. The aspirator method of claim 1, wherein the aspirator barrel comprises an extendable channel wall comprising telescoping segments, wherein the telescoping segments friction lock together in response to the aspirator barrel transitioning to the extended state.

3. The aspirator method of claim 1, further comprising inflating an inflatable device via the air channel.

* * * * *